United States Patent [19]

Bronstein

[11] Patent Number: 4,525,043
[45] Date of Patent: Jun. 25, 1985

[54] CONTACT LENS

[76] Inventor: Leonard Bronstein, 2928 N. 30th St., Phoenix, Ariz. 85016

[21] Appl. No.: 141,949

[22] Filed: Apr. 21, 1980

Related U.S. Application Data

[63] Continuation-in-part of Ser. No. 850,857, Nov. 11, 1977, abandoned.

[51] Int. Cl.³ .......................... G02C 7/04; G02C 7/06
[52] U.S. Cl. ................................ 351/160 R; 351/161
[58] Field of Search .............. 351/160 H, 160 R, 161, 351/162

[56] References Cited

U.S. PATENT DOCUMENTS

| Re. 25,286 | 11/1962 | De Carle | 351/161 |
| 3,950,082 | 4/1976 | Volk | 351/161 X |
| 4,302,081 | 11/1981 | Tsuetaki | 351/161 |
| 4,418,991 | 12/1983 | Breger | 351/161 |

Primary Examiner—John K. Corbin
Assistant Examiner—Scott J. Sugarman
Attorney, Agent, or Firm—Don J. Flickinger

[57] ABSTRACT

A contact lens whose posterior surface has three zones, a central, an intermediate and a peripheral. The anterior surface of the lens also has a central zone corresponding to the posterior central zone. The central zones of these surfaces form the optical zone of the lens. The posterior intermediate zone of the lens is aspheric with its radius of curvature increasing continuously from the central to the peripheral zones to cause the cornea to assume a more optimal shape. The chord diameter of the posterior central zone is equal to or less than the measured maximum radius of curvature of the central zone of the cornea and preferably larger than the largest measured diameter of the pupil of the eye of the patient. The radius of curvature of the posterior central zone is such that the difference between the sag depth of the posterior central zone of the lens and the sag depth of the corresponding corneal central zone having the greatest measured spherical radius of curvature is in the range of zero to 15 microns. The radius of curvature of the lens in conjunction with that of the posterior central zone, provides the wearer substantially normal distance vision. For the presbyope, the optical zone can be modified to provide normal near as well as distant vision. The peripheral zone is beveled to provide limbal clearance.

20 Claims, 12 Drawing Figures

U.S. Patent   Jun. 25, 1985   Sheet 1 of 3   4,525,043

CONTACT LENS

CROSS REFERENCE TO RELATED APPLICATION

This application is a continuation-in-part of application Ser. No. 850,857, filed Nov. 11, 1977, now abandoned.

BACKGROUND OF THE INVENTION

1. Field of the Invention

This invention is in the field of contact lenses and more particularly, relates to contact lenses which cause the corneas of patients wearing them to assume aspheric shapes, and which correct the vision of the patients by providing single vision optics for the nonpresbyope and bifocal or multifocal optics for the presbyope.

2. Description of the Prior Art

For many years, the posterior surface of contact lenses have been made spherical and have been used to change the radii of curvature of the cornea to reduce or correct the myopia of the wearer, or patient, and to provide the patient with normal distance vision. Measurements of the radii of curvature of the myopic cornea, particularly of the central, intermediate and near peripheral zones of the cornea, up to a chord diameter of approximately 8.5 mm, reveals that the myopic cornea usually has variations in curvature from its center, or apex, to the periphery as defined above. Typically, the measurements show a difference in radii of curvature between the nasal side and the temporal side and between the superior portion of the cornea and the inferior. Contact lenses having a spherical posterior surface utilizing from two to five different radii of curvatures in adjacent zones, with the radii being greater than that of the corresponding zones of the cornea, for example, have been used to reduce the degree of myopia.

While lenses having such shapes have reduced the myopia, the resulting shape of the cornea of the wearer on the nasal side becomes substantially spherical from near the center to near the periphery with a radius of curvature substantially that of the near periphery on the nasal side before wearing such lenses. The temporal side of the cornea from near the center to the periphery of the cornea, becomes substantially spherical with a radius of curvature substantially that of the temporal near periphery of the cornea before the wearer started wearing the lenses. The superior and inferior portions of the cornea produces similar results. Stating the results in another way, each half meridian of the wearers cornea became substantially spherical from near the center to the measured near periphery and the radius of curvature of each half meridian is substantially that of the measured near periphery of the cornea prior to wearing the contact lenses.

In those lenses where the spherical radius of curvature of the central zone of the posterior surface of each lens is significantly greater than the radius of curvature of the central zone of the cornea of the patient, the radius of curvature of the central zone of the cornea increases, and can become distorted; i.e., it deviates from being spherical to a degree which adversely affects, or distorts, the patient's vision. In those lenses where the spherical radius of curvature of the central zone of the posterior surface of each such lens is significantly less than the radius of curvature of the central zone of the cornea of the patient, or if the chord diameter of the central or optical zone of the posterior surface is too large and the lens is made of a material not permeable to oxygen, the radius of curvature of the central zone of the cornea becomes less and the cornea edematous. When such a lens is made of an oxygen permeable material, the radius of curvature of the center zone of the cornea decreases, but edema of the cornea may not occur.

The corneas of patients who have worn essentially spherical prior art contact lenses for a substantial period of time are reshaped so that on any single meridian, the radius of curvature will be substantially the same from the center to the near periphery. As a result, the perimeter, or edge, of the contact lens tends to extend outside, or beyond, the limbal bounds of the cornea so that the lenses are almost always decentered on the cornea. Prior art contact lenses have also had a problem providing adequate circulation of tears, lacrimal fluid, between the lens and the cornea to substantially prevent edema while providing single vision optics for the nonpresbyope and bifocal or multifocal optics for the presbyope that provides the wearer with substantially normal vision.

While other prior art contact lenses have had aspheric posterior surfaces, they have been aspheric from center to edge, which while producing, or inducing, the cornea to assume a more desirable shape conducive to better centering of a lens on the patient's cornea, they have not provided the optics needed to provide the patient with good vision. The prior art lenses have been able to provide good optics or a good shape to the cornea, but not both.

SUMMARY OF THE INVENTION

The present invention provides contact lenses for correcting the vision of the eye of a patient in which the lens body is made of a refractive material, which material may be either oxygen permeable or not. The posterior surface of the lens has a central zone, an intermediate zone and a peripheral zone. The anterior surface of the lens also has a central zone which corresponds to the central zone of the posterior surface. The two central zones define the optically effective portion, or zone, of the lens for correcting the vision of the patient. The posterior central zone of the lens has a chord diameter which is equal to or less than the measured maximum radius of curvature at the center of the cornea, and which is preferably larger than the largest measured diameter of the pupil of the eye of the wearer. The radius of curvature of the posterior central zone of the lens is chosen so that the difference between the sag depth of the posterior central zone of the lens and that of the center of the cornea over the same chord diameter is in the range of 0–15 microns. The central zone of the anterior surface has a radius of curvature which, in conjuction with the central zone of the posterior surface, provides the proper power factor to cause the wearer to have substantially normal distance vision. The intermediate annular zone of the posterior surface is aspheric, the curvature of which increases continuously from its least value adjacent the central zone to its maximum value adjacent the peripheral zone to produce, on the cornea, an aspheric surface. The peripheral annular zone of the posterior surface is beveled to provide limbal clearance when the lens edge moves to the extremity of the cornea, but not to an extent to provide excessive peripheral standoff which would irritate the eyelid on blinking. The peripheral zone does promote the circulation of lacrimal fluid between the cornea and the lens.

It is therefore an object of this invention to provide a contact lens, the posterior surface of which has an aspheric intermediate zone which causes the outer zones of the cornea of the wearer to become aspheric which aspheric shape of the cornea aids in centering a contact lens on the cornea.

It is still another object of this invention to provide a contact lens in which the posterior surface is shaped to cause the central zone and the adjacent inner portion of the intermediate zone of the cornea of the wearer to become more spherical and the outer portion of the intermediate zone and the peripheral zone of the cornea of the patient to assume an aspheric shape.

It is another object of this invention to provide a contact lens in which the optical central zones provide single vision optical correction for the nonpresbyope and bifocal or multifocal optics for the presbyope.

It is yet another object of this invention to provide a contact lens in which the chord diameter and radius of curvature of the posterior central zone of the lens has a sag depth relationship with the cornea which provides an optimal fit without distorting the optical zone of the cornea or causing edema irrespective of the type of material from which the lens is made, and concurrently providing proper vision for the patient.

It is a further object of the invention to provide a contact lens that is able to provide good optics to correct the vision of the presbyope and nonpresbyope and to induce the cornea to assume a more desirable shape conducive to better centering of a lens on a cornea.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
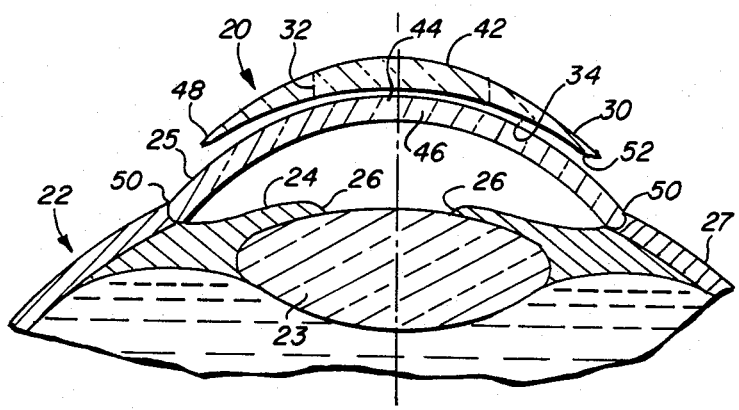
FIG. 1 is a schematic section of an embodiment of the lens and the cornea and lens and iris of the eye of a patient.
Figure 2:
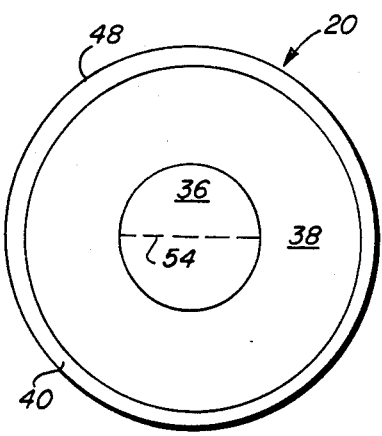
FIG. 2 is a plan view of the posterior surface of the lens of FIG. 1.

In FIG. 1, lens 20 is illustrated in position on the eye 22 of the patient, or wearer; only the crystalline lens 23, iris 24, cornea 25, pupil 26 and a portion of the sclera 27 are illustrated. The body 30 of lens 20 is made of a refractive material such as methyl-methacrylate or silicone. Lens 20 has an anterior surface 32 and a posterior surface 34. Posterior surface 34, as is best illustrated in FIG. 2, is divided into three zones, a central zone 36, an intermediate zone 38 and a peripheral zone 40. Anterior surface 32 also has a central zone 42 corresponding to posterior central zone 36 with both central zones having substantially the same chord diameter. Central zones 36 and 42 define the optical zone of lens 20 through which light passes through cornea 25, pupil 26 and crystalline lens 23 to the interior of eye 22. The apex 44 of cornea 25 is at the center of the corneal central zone 46 which is defined as having substantially the same chord diameter as zone 36. Peripheral zone 40 is provided with a well blended bevel at its edge, or perimeter, 48. Zone 40 consists of a spherical radius of curvature which is sufficiently large so that it clears the limbus 50 of cornea 25 when edge 48 moves to an extremity of cornea 25, but not so large as to provide excessive standoff which would irritate the eyelid on blinking. Peripheral zone 40 can comprise more than one contiguous spherical surface, however, only one such surface is illustrated in FIGS. 1 and 2. Peripheral zone 40 also promotes circulation of lacrimal fluid, tears, between lens 20 and cornea 25 to minimize the risk of cornea 25 become edematous.

Figure 11:
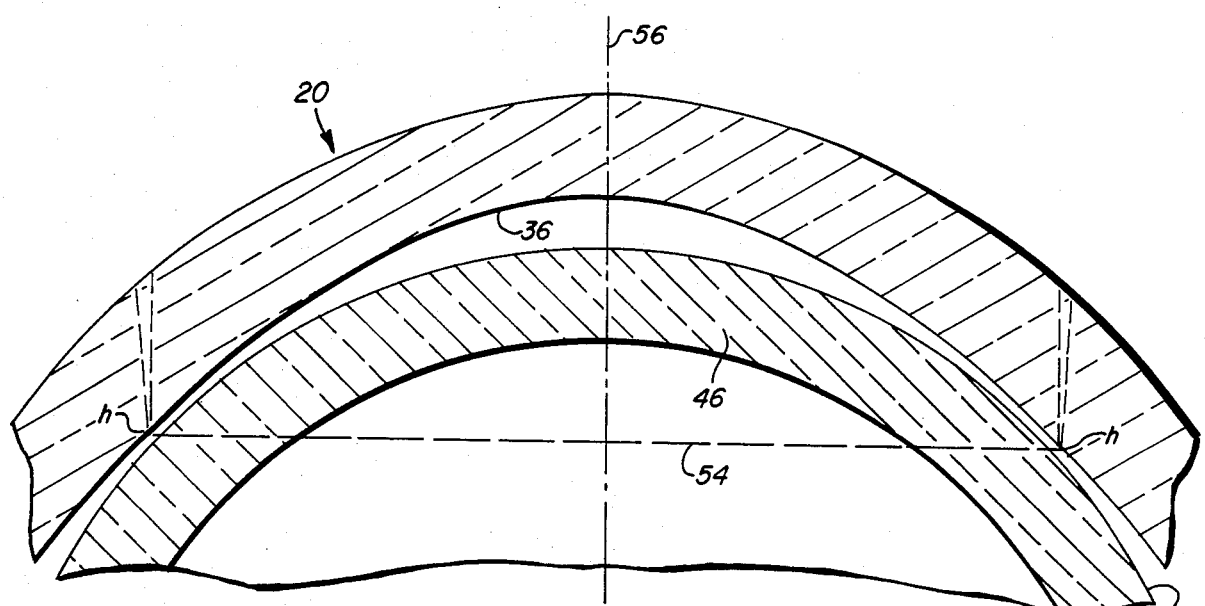
FIG. 11 is a schematic section greatly enlarged illustrating the differences between the sag depth of the posterior central zone of a lens of the invention and the sag depth of the corresponding zone of the cornea of the patient when the radius of curvature of the lens is less than that of the corneal central zone.
Figure 12:
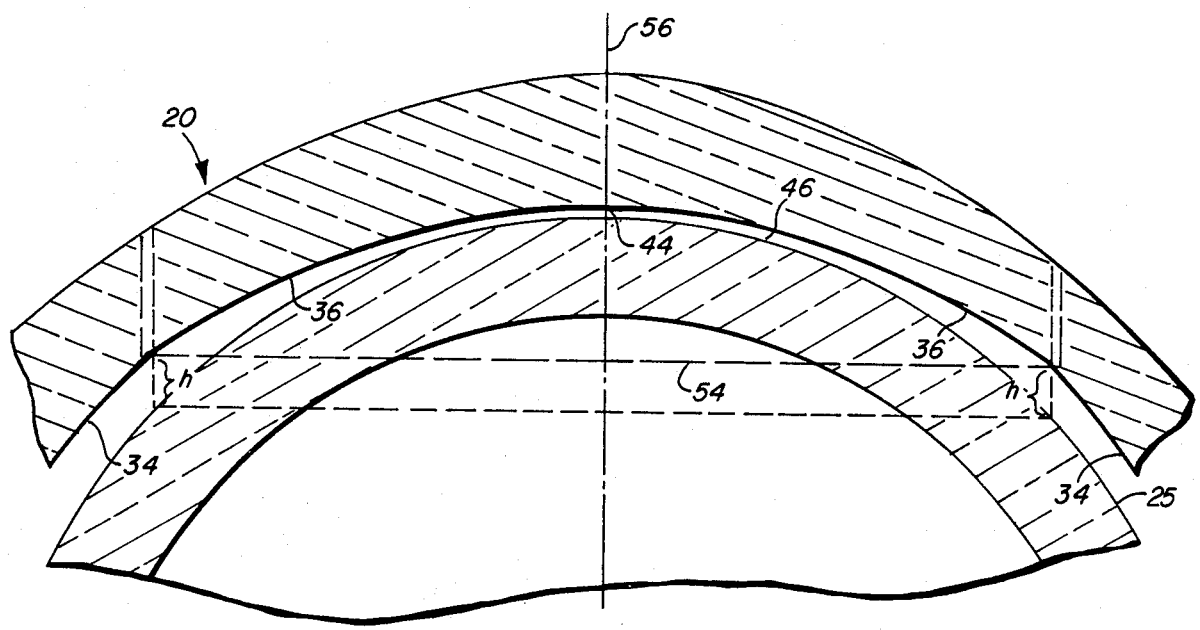
FIG. 12 is a schematic section greatly enlarged which is similar to FIG. 11 except that the radius of curvature of the posterior central zone is greater than that of the corneal central zone.

Chord diameter 54 of posterior central zone 36 is made equal to or smaller than the largest radius of curvature of the central zone 46 of the cornea 25 as measured using a conventional keratometer or as determined from keratographs of the cornea and which is preferrably larger than the largest measurable chord diameter of pupil 26. The radius of curvature of the posterior central zone 36 is chosen so that the difference between the sag depth of posterior central zone 36 and the sag depth of corneal central zone 46 determined using the greatest measured radius of curvature of zone 46 is in the range of 0–15 microns as illustrated in FIGS. 11 and 12.

The relationship between chord diameter, spherical radius of curvature and sag depth of a zone such as corneal central zone 46 and posterior central zone 36 is given by the following equation:

$$S^2 + Y^2 = 2rs \qquad \text{Eq. 1}$$

where:
s, is the sag depth of a curve
r, is the spherical radius of curvature of the zone, and
y, is one-half the chord diameter of the zone.

The steps taken to make a lens to fit a given patient's eye are (1) to measure the cornea using a keratometer or keratograph to find the largest radii of curvature over an area in the center of the cornea. (2) to measure the chord diameter of the pupil under dim illumination. The chord diameter 54 of posterior zone 36 can then be determined since it is chosen so that it is equal to, or less than, the largest measured radius of curvature of the center area of the cornea and preferrably larger than the largest measurable chord diameter of the pupil. Choose the chord diameter for the corneal center zone 46 as that chosen for zone 36. The sag depth s for zone 46 can be calculated using equation 1. Once the sag depth of the corneal center zone 46 is calculated, the value for the sag depth of zone 36 can be determined since it is equal to the sag depth of zone 46 plus or minus 0–15 microns. Once a value for the sag depth of zone 36 is picked that satisfies the foregoing requirements, and since the chord diameter for zone 36 has already been determined, these values can be used to solve equation 1 to provide a radius of curvature for zone 36 which satisfies the requirements of this invention.

Where the radius of curvature r of zone 36 of the lens is less than the radius of curvature of the cornea as illustrated in FIG. 11, the distance between the perimeter of central zone 36 and the perimeter of corneal central zone 46 will be substantially zero when lens 20 is centered on cornea 25, i.e., optical axis 56 of the eye passes through the center of zone 36 and the difference in sag depth will appear on axis 56. If the radius of curvature r of zone 36 is greater than the radius of curvature of corneal zone 46, the difference in sag depth of the two zones 36 and 46 appears as the distance between the perimeters of these two zones when the lens 20 is centered on cornea 25 as is illustrated in FIG. 12. The distance between the apex 44 of the cornea and the center of zone 36 will, under these circumstances, be substantially zero in the absence of the normal layer of tears between lens 20 and cornea 25.

The intermediate zone 38 on the posterior surface 34 of lens 20 is aspheric; i.e., the curvature increases continuously from a minimum adjacent the central zone 36 or at the inner edge of the intermediate zone 38, the boundary between zones 38 and 36, to the maximum value at the boundary between the intermediate zone 38 and peripheral zone 40 which is greater than the corresponding part of the cornea 25, in the preferred embodiment, is between 0.10 mm. and 0.20 mm. The chord diameter of the peripheral zone 40 at the boundary between zone 40 and intermediate zone 38 is approximately one millimeter less than the overall chord diameter of lens 20.

The radius of curvature of central zone 42 of anterior surface 32 is substantially spherical, and in combination with the central zone 36 of posterior surface 34 of lens 20, provides the proper correction, or power, so that the distance vision of the wearer is substantially normal. The balance of the anterior surface lying outside of central zone 42 will typically have the same radius of curvature as that of central zone 42, but may be any other radius for special purposes.

Figure 3:
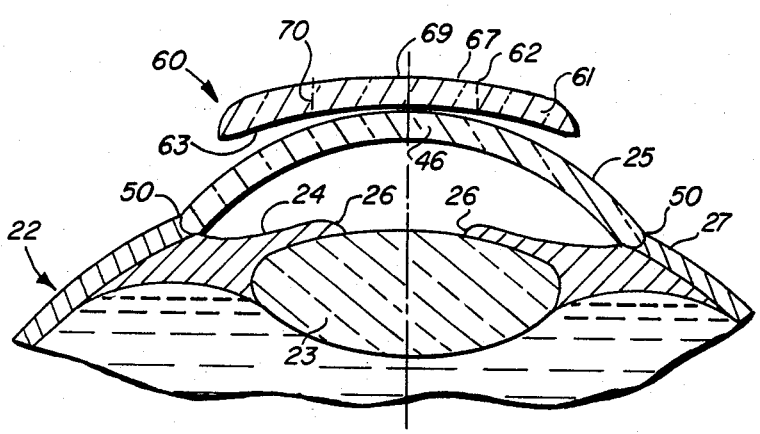
FIG. 3 is a section similar to FIG. 2 of a second embodiment provided with bifocal optics.
Figure 4:
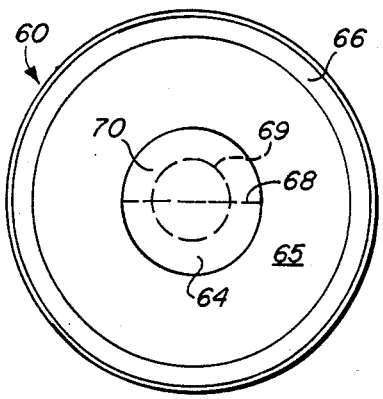
FIG. 4 is a plan view of the posterior surface of the lens of FIG. 3.

Referring to FIGS. 3 and 4, lens 60 has a body 61, an anterior surface 62 and a posterior surface 63. Surface 63 is provided with a central zone 64, an intermediate zone 65 and a peripheral zone 66. Anterior surface 62 has a central zone 67 which substantially corresponds to, i.e., has the same chord diameter as posterior central zone 64. The chord diameter 68 and spherical radius of curvature of the posterior central zone 64, the asphericity of intermediate zone 65 and the structure and function of peripheral zone 66 are determined, or as described, with respect to the corresponding elements of the embodiment of FIGS. 1 and 2. A central circular region 69 of anterior zone 67 has a spherical radius of curvature which, in conjunction with that of posterior central zone 64, provides the proper power factor for normal distance vision. The chord diameter of region 69 is approximately three-quarters of the chord diameter of the pupil 26 when measured under a dim, or low level of, intensity light but is limited substantially to a range between a minimum of 3.0 mm and a maximum of 6.0 mm. The paracentral region 70 of central zone 67, which surrounds the central circular region 69 and constitutes the balance of central zone 67, has a radius of curvature which, in conjunction with the radius of curvature of the posterior central zone 64, provides the proper power factor to correct the patient's near vision to substantially normal. The balance of anterior surface 62 may have a radius of curvature substantially equal to that of paracentral region 70.

Figure 5:
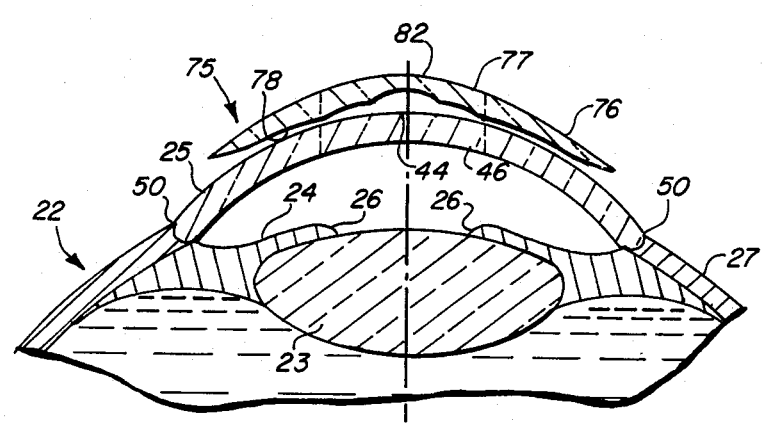
FIG. 5 is a section similar to FIG. 2 of another embodiment provided with bifocal optics.
Figure 6:
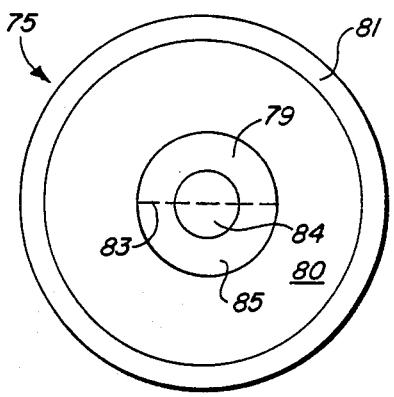
FIG. 6 is a plan view of the posterior surface of the lens of FIG. 5.

Referring to the embodiment illustrated in FIGS. 5 and 6, lens 75 has a body 76, an anterior surface 77 and a posterior surface 78. Posterior surface 78 has three zones, a central zone 79, an intermediate zone 80 and a peripheral zone 81. Anterior surface 77 also has a central zone 82, the chord diameter of which subtantially equals that of posterior zone 79. The structure and function of intermediate zone 80 and peripheral zone 81 corresponds to that of intermediate zone 38 and peripheral zone 40, respectively, of lens 20.

Posterior central zone 79 is divided into regions, a central region 84 and a paracentral region 85. The chord diameter of region 84 is approximately three-quarters of the chord diameter of pupil 26 when measured under a dim, or low level of intensity light, but is limited to a range between a minimum of 3.0 mm. and a maximum of 6.0 mm. Central region 84 replaces center zone 64 of the previous described embodiment of FIGS. 3 and 4 for the purpose of making calculations, and the chord diameter of central region 84 is used in the previous calculations to determine the spherical radius of curvature of central region 84. Utilizing the calculated radius of curvature the central region 84 and the desired add power for near point vision, the radius of curvature of paracentral region 85 is then calculated using the well-known formula:

$$F = \frac{n' - n}{r} \qquad \text{Eq. 2}$$

where:
F=surface power in diopters; and
where:
n', is the index of refraction of the lens material,
n, is the index of refraction of the tears, and
r, is the radius of curvature of that portion of the surface of the lens being calculated.
When the spherical radius of curvature of paracentral region is calculated, it will be flatter than the area of cornea to which it corresponds.

The spherical radius of curvature of anterior central zone 82 and that of the central region 84 of posterior surface 78 provide the proper power factor for providing the patient with substantially normal distance vision. The spherical radius of curvature of paracentral region 85, in conjunction with that of the central zone 82 of anterior surface 77, provides the proper power factor for providing the patient with substantially normal near vision. The balance of anterior surface 77 lying outside of central zone 82 may typically have the same radius of curvature as zone 82, and may further include a thick edged lenticular flange as is well known in the art.

Figure 7:
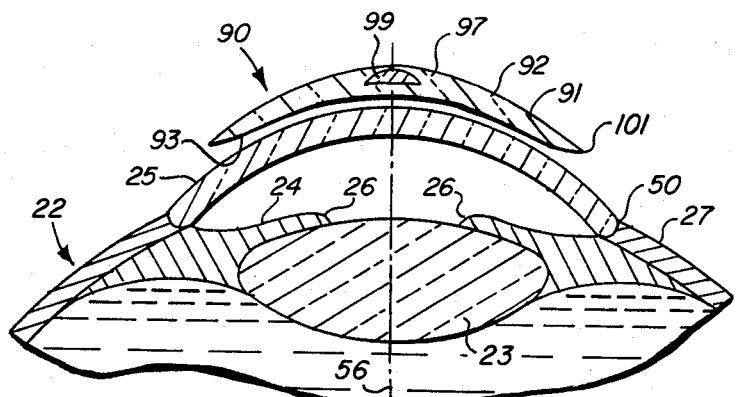
FIG. 7 is a section similar to FIG. 2 of still another embodiment providing bifocal optics.
Figure 8:
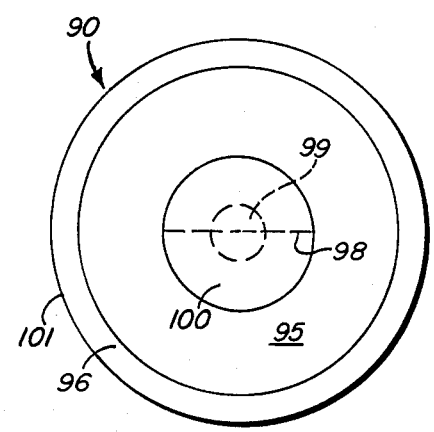
FIG. 8 is a plan view of the posterior surface of the lens of FIG. 7.

In the embodiment illustrated in FIGS. 7 and 8, lens 90 has a body 91 of a refractive material on which are formed anterior surface 92 and a posterior surface 93. Posterior surface 93 has three zones, a central zone 94, an intermediate zone 95 and a peripheral zone 96. Anterior surface 92 also has a central zone 97, the chord diameter of which substantially equals the chord diameter 98 of posterior central zone 94. The chord diameter 98 and spherical radius of curvature of posterior central zone 94 and the asphericity of intermediate zone 95 are determined as described with respect to corresponding elements of the embodiments of FIGS. 1 and 2. The structure and function of peripheral zone 96 corresponds to that of peripheral zone 40 of lens 20 illustrated in FIGS. 1 and 2. A round segment, or wafer, 99 made of a higher index of refraction material is embedded, or fused, in the lower index of refraction material of lens body 91. Segment 99 is positioned so that it is in the center of zones 94, 97, or so that the optical axis 56 of the patient's eye 22 passes through the center of segment 99 when lens 90 is centered on cornea 25. The optical characteristics of wafer 99, in conjunction with the spherical radii of curvature of zones 94 and 97, provides the proper power factor for near vision. The chord diameter of segment 99 is chosen so that it is significantly smaller than the chord diameter of pupil 26 under normal reading illumination but is limited to a range between a minimum of 2.5 mm and a maximum of 3.5 mm. The spherical radii of curvature of zones 94 and 97 in the paracentral region 100 provides the proper optical power factor to provide substantially normal distance vision. The radius of curvature of anterior surface 92 lying outside central zone 97 will generally have the same radius of curvature as central zone 97.

Figure 9:
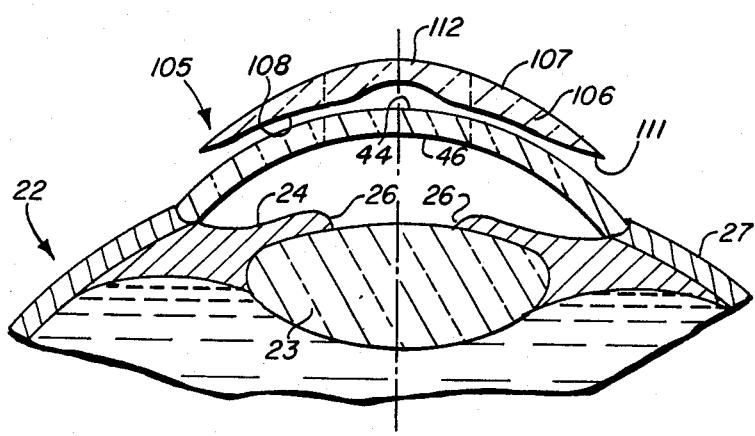
FIG. 9 is a section similar to FIG. 2 of an embodiment of the invention providing multifocal optics.
Figure 10:
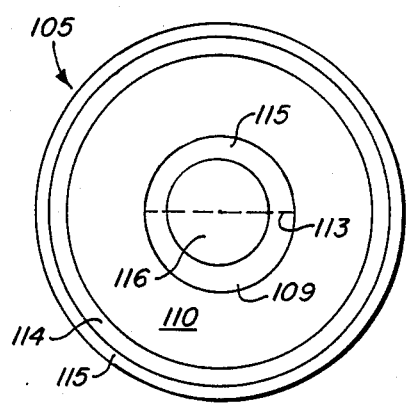
FIG. 10 is a plan view of the posterior surface of the lens of FIG. 9.

In the embodiment illustrated in FIGS. 9 and 10, lens 105 has a body 106, an anterior surface 107 and a posterior surface 108. Posterior surface 108 has three zones, a central zone 109, an intermediate zone 110 and a peripheral zone 111. Anterior surface 107 also has a central zone 112, the chord diameter of which substantially equals the chord diameter 113 of posterior central zone 109. Posterior central zone 109 is divided into two regions, a central region 116 and a paracentral region 117. The chord diameter of central region 116 is approximately three-quarters of the chord diameter of pupil 26 when measured under a dim, or a lower level of intensity light, but is limited to a range between a minimum of 3.0 mm and a maximum of 6.0 mm. The structure and function of intermediate zone 110 and peripheral zone 111 corresponds to that of intermediate zone 80, peripheral zone 81, respectively, of lens 75, except that peripheral zone 111 may be provided with a pair of adjacent spherical surfaces 114 and 115, with the radius of curvature of surface 115 being greater than that of 114.

Utilizing the calculated radius of curvature of central region 116, the radius of curvature of the outer edge of paracentral region 117 is calculated in accordance with the previously described formula, $$F = \frac{n' - n}{r}.$$

The inner edge of paracentral region 117 has substantially the same radius of curvature as central region 116. The radius of curvature of paracentral region 117 is an integrated curve extending between the inner and outer edges. Resultingly, the paracentral region 117 is an aspheric surface, the radius of curvature of which changes continuously from that of the central region at the boundary between the two regions to a radius of curvature necessary in conjunction with the radius of curvature of the anterior central zone 112 to provide the near point full add power to provide the patient with corrected vision from near to distant, and for all distances between, or a multifocal lens for the presbyope patient. The spherical radius of curvature of anterior central zone 112 and that of the posterior central region 116 provides the proper power factor to provide the patient with substantially normal distance vision. The radius of curvature of anterior surface 107 lying outside of central zone 112 will generally be the same as that of central zone 112.

When aspheric lens of this invention is applied, or worn by the patient, the central zone of the patient's cornea becomes more spherical; the inner portion of the intermediate zone of the cornea becomes more spherical and the outer part of the intermediate zone and the near periphery zone assume a specific aspheric shape. The relationship between the central, intermediate and peripheral zones of a cornea are substantially similar to those of the zones of the same name of the posterior surface of a lens. The measured radius of curvature of the inner portion of the intermediate zone of the cornea and its central zone on the nasal and temporal half meridians, for example, become substantially the same with that radius being an average of the nasal and temporal curves measured in the near periphery zone of the cornea prior to lens application. The radius of curvature of the inner portion of the intermediate zone of the cornea and its central zone measured on inferior and superior half meridians will also become substantially the same with the radius being the average of the superior and inferior curve measured in the near periphery zones prior to lens application. However, the near peripheral and outer portion of the intermediate zone of the cornea measured on any meridian will have a greater radius of curvature than the inner intermediate area of the cornea on the same meridian.

The shape of the cornea, as described above, is much more ideal for the long term wearer of contact lenses because it aids in centering a contact lens on a cornea. At the same time, lenses of this invention will permit adequate movement for proper fluid exchange which significantly reduces the risk of corneas becoming edematous, even if nonoxygen permeable materials are used in fabricating the lenses, while providing the patients with properly corrected distant, bifocal or multifocal vision.

It should be evident that various modifications can be made to the described embodiments without departing from the scope of the present invention.

What is claimed is:

1. A corneal contact lens for correcting the vision of an eye of a patient, said lens comprising:

a lens body made of a refractive material, said body having an anterior surface and a posterior surface, said posterior surface having a central zone, an intermediate zone, and a peripheral zone, said anterior surface having a central zone corresponding to the central zone of the posterior zone, the portion of the lens body defined by the posterior and anterior central zones substantially defining the optically effective portion of the lens for correcting the vision of the wearer;

the central zone of the posterior surface having a chord diameter and a radius of curvature;

the chord diameter being preferably larger than the largest measurable chord diameter of the pupil of the eye of the patient but which is equal to or less than the maximum measured central spherical radius of curvature of the cornea of the patient;

the radius of curvature of the posterior central zone being such that the sag depth difference between the measured greatest central spherical radius of curvature of the cornea and that of the posterior central zone of the lens is in the range of from 0-15 microns;

the central zone of the anterior surface having a radius of curvature which, in conjunction with the posterior surface of the central zone, provides the proper power factor to provide the patient with substantially normal distance vision;

the intermediate annular zone of the posterior surface being aspheric with a curvature that increases continuously from its least value adjacent the central zone to its maximum value adjacent the peripheral zone, said curvature adjacent the posterior peripheral zone being greater than the corresponding zone of the cornea, said posterior intermediate zone controlling the change of shape of the cornea; and the peripheral annular zone having a spherical radius of curvature to provide limbal clearance.

2. The corneal contact lens of claim 1 in which one of the zones defining the optically effective portion of the lens is provided with a central region and a paracentral region and in which the spherical radius of curvature of the central region of said one zone in conjunction with that of the other central zone provides the proper power factor for normal distance vision.

3. The corneal contact lens of claim 2 in which the chord diameter of the central region is approximately three-fourths of the chord diameter of the pupil when measured under dim light conditions but is limited to a range between 3.0 and 6.0 mm.

4. The corneal contact lens of claim 3 in which the spherical radius of curvature of the paracentral region of said one zone, in conjunction with the radius of curvature of the other central zone, provides the proper power factor to correct the patient's near vision to substantially normal.

5. The corneal contact lens of claim 4 in which the central zone having the central region and the paracentral region is on the anterior surface of the lens.

6. The corneal contact lens of claim 4 in which the central zone having the central region and the paracentral region is on the posterior surface of the lens, and which central region has a sag depth difference ranging from 0-15 microns.

7. The corneal contact lens of claim 6 in which the radius of curvature r of the paracentral region satisfies the equation $$F = \frac{n' - n}{r}$$

to provide the proper near vision for the patient where, F is the surface power in diopters, n' is the index of refraction of the lens material, and n is the index of refraction of tears.

8. The corneal contact lens of claim 3 in which the paracentral region of said one zone is aspheric, the curvature of said paracentral region increasing continuously from its boundary with the central region to its boundary with the intermediate zone, the curvature of the paracentral region, in conjunction with that of the central zone of the other surface, providing the patient with corrected vision from near to distant and for all distances between.

9. The corneal contact lens of claim 8 in which the central zone having the central region and the paracentral region is on the posterior surface of the lens, and which central region has a sag depth difference ranging from 0-15 microns.

10. The corneal contact lens of claim 9 in which the radious of courvature r of the outer edge of the paracentral region is calculated using the formula $$F = \frac{n' - n}{r}$$

and the inner edge has substantially the same radius of curvature as the central region where, F is the surface power in diopters, n' is the index of refraction, and n is the index of refraction of tears.

11. The corneal contact lens of claim 9 in which the radius of curvature of the parcentral region is an enlarged curve extending between the inner edge of the paracentral region and the outer edge of the intermediate zone.

12. The corneal contact lens of claim 1 in which a wafer made from a material having a differing index of refraction from that of the lens body is positioned in the optically effective portion of the lens, the optical characteristics of the wafer, in conjunction with the spherical radii of curvature of the anterior and posterior central zones, providing the proper power factor to correct the vision of the patient.

13. The corneal contact lens of claim 12 in which the index of refraction of the wafer is greater than that of the lens body.

14. The corneal contact lens of claim 13 in which the wafer, in conjunction with the radius of curvature of the posterior and anterior zones of the lens, provides the proper power factor to provide the patient with substantially normal near vision, the spherical radii of curvature of the posterior and anterior central zones of the lens provide the proper optical power for substantially normal distance vision.

15. The corneal contact lens of claim 14 in which the chord diameter of the wafer is preferably smaller than the chord diameter of the pupil of the patient under normal reading illumination, but is limited to a range substantially between 2.5 mm and 3.5 mm.

16. The corneal contact lens of claim 15 in which the wafer is positioned so that it is substantially located in the center of the posterior and anterior central zones of the lens.

17. The corneal contact lens of claim 16 in which the weight of the lens is such that the patient will see through the portions of the anterior and posterior central zones of the lens when the patient is looking directly ahead which provide normal distance vision.

18. The corneal contact lens of claim 9 in which the peripheral zone of the posterior surface of the lens is provided with a pair of spherical surfaces.

19. The corneal contact lens of claim 18 in which the radius of curvature of the outer spherical surface of the two surfaces of the peripheral zone is the greater.

20. The corneal contact lens of claim 1 in which the curvature of the posterior intermediate zone adjacent the posterior peripheral zone is substantially in the range of from 0.10 mm to 0.20 mm. greater than that of the corresponding part of the cornea.

* * * * *